(12) United States Patent
Light

(10) Patent No.: US 11,675,912 B2
(45) Date of Patent: *Jun. 13, 2023

(54) SYSTEMS AND METHODS FOR GENERATING SECURITY IMPROVEMENT PLANS FOR ENTITIES

(71) Applicant: BitSight Technologies, Inc., Boston, MA (US)

(72) Inventor: Marc Noel Light, Somerville, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/307,577

(22) Filed: May 4, 2021

(65) Prior Publication Data
US 2021/0326449 A1    Oct. 21, 2021

Related U.S. Application Data

(63) Continuation of application No. 16/922,673, filed on Jul. 7, 2020, now Pat. No. 11,030,325, which is a
(Continued)

(51) Int. Cl.
*G06F 21/57* (2013.01)
*G06F 17/18* (2006.01)
(Continued)

(52) U.S. Cl.
CPC ............ *G06F 21/577* (2013.01); *G06F 17/18* (2013.01); *G06N 5/04* (2013.01); *G06N 20/00* (2019.01); *G06F 2221/034* (2013.01)

(58) Field of Classification Search
CPC .. G06F 21/577; G06F 17/18; G06F 2221/034; G06N 5/04; G06N 20/00;
(Continued)

(56) References Cited

U.S. PATENT DOCUMENTS

| 5,867,799 A | 2/1999 | Lang et al. |
| 6,016,475 A | 1/2000 | Miller et al. |

(Continued)

FOREIGN PATENT DOCUMENTS

| WO | WO-2017/142694 A1 | 1/2019 |
| WO | WO-2019/023045 A1 | 1/2019 |

OTHER PUBLICATIONS

U.S. Appl. No. 17/025,930, Methods for Using Organizational Behavior for Risk Ratings, Sep. 18, 2020.
(Continued)

*Primary Examiner* — Abiy Getachew
(74) *Attorney, Agent, or Firm* — Goodwin Procter LLP

(57) ABSTRACT

A computer-implemented method is provided for statistical modeling of entities of a particular type. The method can include obtaining entity data including a plurality of entity data sets, each entity data set associated with a respective entity and including values for one or more static parameters indicative of a type of the entity. Each entity data set can include (i) values for input parameter(s) indicative of a security profile of the entity and (ii) a value of a security class parameter indicative of a security class of the entity based on the values of the input parameters. The method can include training a statistical classifier to infer a value of the security class parameter indicative of the security class of a particular entity of the particular type based on values of one or more of the input parameters indicative of a security profile of the particular entity.

20 Claims, 6 Drawing Sheets

Related U.S. Application Data continuation of application No. 16/514,771, filed on Jul. 17, 2019, now Pat. No. 10,726,136.

(51) Int. Cl.
*G06N 5/04* (2023.01)
*G06N 20/00* (2019.01)

(58) Field of Classification Search
CPC ........ G06N 5/003; G06N 7/005; G06N 20/20; G06N 20/10; H04L 63/102; H04L 63/1433
See application file for complete search history.

(56) References Cited

U.S. PATENT DOCUMENTS

| | | |
|---|---|---|
| 6,745,150 B1 | 6/2004 | Breiman |
| 6,785,732 B1 | 8/2004 | Bates et al. |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| D652,048 S | 1/2012 | Joseph |
| D667,022 S | 9/2012 | LoBosco et al. |
| 8,359,651 B1 | 1/2013 | Wu et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| D691,164 S | 10/2013 | Lim et al. |
| D694,252 S | 11/2013 | Helm |
| D694,253 S | 11/2013 | Helm |
| 8,584,233 B1 | 11/2013 | Yang et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,752,183 B1 | 6/2014 | Heiderich et al. |
| 8,775,402 B2 | 7/2014 | Baskerville et al. |
| 8,806,646 B1 | 8/2014 | Daswani et al. |
| 8,825,662 B1 | 9/2014 | Kingman et al. |
| 8,949,988 B2 | 2/2015 | Adams et al. |
| 8,966,639 B1 | 2/2015 | Roytman et al. |
| D730,918 S | 6/2015 | Park et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,420,049 B1 | 8/2016 | Talmor et al. |
| 9,424,333 B1 | 8/2016 | Bisignani et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| 9,736,019 B2 | 8/2017 | Hardison et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D809,989 S | 2/2018 | Lee et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |

(56) References Cited

U.S. PATENT DOCUMENTS

| | | |
|---|---|---|
| D863,335 S | 10/2019 | Hardy et al. |
| D863,345 S | 10/2019 | Hardy et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| D880,512 S | 4/2020 | Greenwald et al. |
| D894,939 S | 9/2020 | Braica |
| 10,764,298 B1 | 9/2020 | Light et al. |
| 10,776,483 B2 | 9/2020 | Bagulho Monteiro Pereira |
| 10,796,260 B2 | 10/2020 | Brannon et al. |
| D903,693 S | 12/2020 | Li et al. |
| D905,712 S | 12/2020 | Li et al. |
| D908,139 S | 1/2021 | Hardy et al. |
| 10,896,394 B2 | 1/2021 | Brannon et al. |
| 10,909,488 B2 | 2/2021 | Hecht et al. |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| D924,909 S | 7/2021 | Nasu et al. |
| 11,126,723 B2 | 9/2021 | Bagulho Monteiro Pereira |
| 11,379,773 B2 | 7/2022 | Vescio |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0088570 A1 | 5/2004 | Roberts et al. |
| 2004/0098375 A1 | 5/2004 | DeCarlo |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0234767 A1 | 10/2005 | Bolzman et al. |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0148408 A1 | 6/2008 | Kao et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2008/0270458 A1 | 10/2008 | Gvelesiani |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0276835 A1 | 11/2009 | Jackson et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0024033 A1 | 1/2010 | Kang et al. |
| 2010/0042605 A1 | 2/2010 | Cheng et al. |
| 2010/0057582 A1 | 3/2010 | Arfin et al. |
| 2010/0114634 A1 | 5/2010 | Christiansen et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239300 A1 | 9/2011 | Klein et al. |
| 2011/0249002 A1 | 10/2011 | Duplessis et al. |
| 2011/0282997 A1 | 11/2011 | Prince et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0055386 A1 | 2/2013 | Kim et al. |
| 2013/0060351 A1 | 3/2013 | Imming et al. |
| 2013/0080505 A1 | 3/2013 | Nielsen et al. |

(56) References Cited

U.S. PATENT DOCUMENTS

| | | |
|---|---|---|
| 2013/0086521 A1 | 4/2013 | Grossele et al. |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0263270 A1 | 10/2013 | Cote et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137257 A1 | 5/2014 | Martinez et al. |
| 2014/0146370 A1 | 5/2014 | Banner et al. |
| 2014/0173066 A1 | 6/2014 | Newton et al. |
| 2014/0173736 A1 | 6/2014 | Liu |
| 2014/0189098 A1 | 7/2014 | MaGill et al. |
| 2014/0204803 A1 | 7/2014 | Nguyen et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0119373 A1 | 4/2016 | Fausto et al. |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0241560 A1 | 8/2016 | Reshadi et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0104783 A1 | 4/2017 | Vanunu et al. |
| 2017/0142148 A1 | 5/2017 | Bu Er et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0279843 A1 | 9/2017 | Schultz et al. |
| 2017/0289109 A1 | 10/2017 | Caragea |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0285414 A1 | 10/2018 | Kondiles et al. |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0065545 A1 | 2/2019 | Hazel et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1 | 5/2019 | Steele et al. |
| 2019/0179490 A1 | 6/2019 | Barday et al. |
| 2019/0215331 A1 | 7/2019 | Anakata et al. |
| 2019/0238439 A1 | 8/2019 | Pugh et al. |
| 2019/0297106 A1 | 9/2019 | Geil et al. |
| 2019/0303574 A1 | 10/2019 | Lamay et al. |
| 2019/0362280 A1 | 11/2019 | Vescio |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0012794 A1 | 1/2020 | Saldanha et al. |
| 2020/0053127 A1 | 2/2020 | Brotherton et al. |

(56) References Cited

U.S. PATENT DOCUMENTS

| | | |
|---|---|---|
| 2020/0065213 A1 | 2/2020 | Poghosyan et al. |
| 2020/0074084 A1 | 3/2020 | Dorrans et al. |
| 2020/0092172 A1 | 3/2020 | Kumaran et al. |
| 2020/0097845 A1 | 3/2020 | Shaikh et al. |
| 2020/0106798 A1 | 4/2020 | Lin |
| 2020/0125734 A1 | 4/2020 | Light et al. |
| 2020/0183655 A1 | 6/2020 | Barday et al. |
| 2020/0272763 A1 | 8/2020 | Brannon et al. |
| 2020/0285737 A1 | 9/2020 | Kraus et al. |
| 2020/0356689 A1 | 11/2020 | McEnroe et al. |
| 2020/0356695 A1 | 11/2020 | Brannon et al. |
| 2021/0064746 A1 | 3/2021 | Koide et al. |

OTHER PUBLICATIONS

U.S. Appl. No. 17/069,151, Information Technology Security Assessment System, Oct. 13, 2020.
U.S. Appl. No. 29/599,622, Computer Display With Security Ratings Graphical User Interface, Apr. 5, 2017.
U.S. Appl. No. 29/599,620, Computer Display With Security Ratings Graphical User Interface, Apr. 5, 2017.
U.S. Appl. No. 16/015,686, Methods for Mapping IP Addresses and Domains to Organizations Using User Activity Data, Jun. 22, 2018.
U.S. Appl. No. 16/543,075, Methods for Mapping IP Addresses and Domains to Organizations Using User Activity Data, Aug. 16, 2019.
U.S. Appl. No. 16/738,825, Methods for Mapping IP Addresses and Domains to Organizations Using User Activity Data, Jan. 9, 2020.
U.S. Appl. No. 17/146,064, Methods for Mapping IP Addresses and Domains to Organizations Using User Activity Data, Jan. 11, 2021.
U.S. Appl. No. 15/918,286, Correlated Risk in Cybersecurity, Mar. 12, 2018.
U.S. Appl. No. 16/292,956, Correlated Risk in Cybersecurity, May 5, 2019.
U.S. Appl. No. 16/795,056, Correlated Risk in Cybersecurity, Feb. 19, 2020.
U.S. Appl. No. 17/179,630, Correlated Risk in Cybersecurity, Feb. 19, 2021.
U.S. Appl. No. 16/170,680, Systems and Methods for Remote Detection of Software Through Browser Webinjects, Oct. 25, 2018.
U.S. Appl. No. 16/688,647, Systems and Methods for Remote Detection of Software Through Browser Webinjects, Nov. 19, 2019.
U.S. Appl. No. 17/000,135, Systems and Methods for Remote Detection of Software Through Browser Webinjects, Aug. 21, 2020.
U.S. Appl. No. 15/954,921, Systems and Methods for External Detection of Misconfigured Systems, Apr. 17, 2018.
U.S. Appl. No. 17/014,495, Systems and Methods for External Detection of Misconfigured Systems, Sep. 8, 2020.
U.S. Appl. No. 16/549,764, Systems and Methods for Inferring Entity Relationships Via Network Communications of Users or User Devices, Aug. 23, 2019.
U.S. Appl. No. 16/787,650, Systems and Methods for Inferring Entity Relationships Via Network Communications of Users or User Devices, Feb. 11, 2020.
U.S. Appl. No. 16/583,991, Systems and Methods for Network Asset Discovery and Association Thereof With Entities, Sep. 26, 2019.
U.S. Appl. No. 17/085,550, Systems and Methods for Network Asset Discovery and Association Thereof With Entities, Oct. 30, 2020.
U.S. Appl. No. 29/666,942, Computer Display With Graphical User Interface, Oct. 17, 2018.
U.S. Appl. No. 16/360,641, Systems and Methods for Forecasting Cybersecurity Ratings Based on Event-Rate Scenarios, Mar. 21, 2019.
U.S. Appl. No. 16/514,771, Systems and Methods for Generating Security Improvement Plans for Entities, Jul. 17, 2019.
U.S. Appl. No. 16/922,672, Systems and Methods for Generating Security Improvement Plans for Entities, Jul. 7, 2020.
U.S. Appl. No. 29/677,306, Computer Display With Corporate Hierarchy Graphical User Interface Computer Display With Corporate Hierarchy Graphical User Interface, Jan. 18, 2019.
U.S. Appl. No. 16/775,840, Systems and Methods for Assessing Cybersecurity State of Entities Based on Computer Network Characterization, Jan. 29, 2020.
U.S. Appl. No. 17/018,587, Systems and Methods for Assessing Cybersecurity State of Entities Based on Computer Network Characterization, Sep. 11, 2020.
U.S. Appl. No. 17/346,970, Systems and Methods for Assessing Cybersecurity State of Entities Based on Computer Network Characterization, Jun. 14, 2021.
U.S. Appl. No. 17/132,512, Systems and Methods for Rapidly Generating Security Ratings, Dec. 23, 2020.
U.S. Appl. No. 16/779,437, Systems and Methods for Rapidly Generating Security Ratings, Jan. 31, 2020.
U.S. Appl. No. 17/119,822, Systems and Methods for Cybersecurity Risk Mitigation and Management, Dec. 11, 2020.
U.S. Appl. No. 16/802,232, Systems and Methods for Improving a Security Profile of an Entity Based on Peer Security Profiles, Feb. 26, 2020.
U.S. Appl. No. 16/942,452, Systems and Methods for Improving a Security Profile of an Entity Based on Peer Security Profiles, Jul. 29, 2020.
U.S. Appl. No. 29/736,641, Computer Display With Peer Analytics Graphical User Interface, Jun. 2, 2020.
U.S. Appl. No. 17/039,675, Systems and Methods for Determining Asset Importance in Security Risk Management, Sep. 30, 2020.
U.S. Appl. No. 17/320,997, Systems and Methods for Determining Asset Importance in Security Risk Management, May 14, 2021.
U.S. Appl. No. 16/884,607, Systems and Methods for Managing Cybersecurity Alerts, Apr. 21, 2021.
U.S. Appl. No. 17/236,594, Systems and Methods for Managing Cybersecurity Alerts, Apr. 21, 2021.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Master Security Criteria," Version 3.0, BITS Financial Services Security Laboratory, Oct. 2001, 47 pages.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV06EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.ll.miLedufpublicationsflabnotesfpluggingtherightho! . . . , 2 pages.
"Rapid7 Nexpose Vulnerability Scanner," accessed on the internet at https://www.rapid7.com/products/nexpose/download/, 3 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 paqes.

(56) References Cited

OTHER PUBLICATIONS

"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Application as filed, pending claims of U.S. Appl. No. 13/240,572 as of Nov. 18, 2015, 45 pages.
Artz, Michael Lyle, "NetSPA: A Network Security Planning Architecture," Massachusetts Institute of Technology, May 24, 2002, 97 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Camelo, "Botnet Cluster Identification," Sep. 2014, 90 pages.
Camelo, "Condenser: A Graph-based Approach for Detecting Botnets," AnubisNetworks R&D, Amadora, Portugal and Centria, Universidade Nova de Lisboa, Portugal (pp. 8) Oct. 31, 2014.
Carstens, et al., "Modeling Company Risk and Importance in Supply Graphs," European Semantic Web Conference 2017: The Semantic Web pp. 18-31.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, the DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gephi (gephi.org), accessed on the internet at https://web.archive.org/web/20151216223216/https://gephi.org/; Dec. 16, 2015; 1 page.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (Policy). Http://ieeexplore.ieee.org/stamp/stamp.jsp?arnumber=5976796. 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al, "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Lippmann, RP., et al., "An Annotated Review of Papers on Attack Graphs," Project Report Ia-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report Ia-2, MIT Lincoln Laboratory, Oct. 5, 2005, 96 pages.
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber= 1258471 (Year: 2003).
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
MaxMind, https://www.maxmind.com/en/about-maxmind,https://www.maxmind.com/en/geoip2-isp-database, date accessed Sep. 28, 20116, 3 pages.

(56) References Cited

OTHER PUBLICATIONS

Mcnab, "Network Security Assessment," copyright 2004, 13 pages.
Mcnab, "Network Security Assessment," copyright 2004, 56 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Morningstar Direct, dated to Nov. 12, 202, morningstardirect.com [online]. Retrieved Feb. 26, 2021 from internet <URL:https://web.archive.org/web/20201112021943/https://www.morningstar.com/products/direct> (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The Mitre Corporation, 2014, 6 pages.
Nye, John, "Avoiding Audit Overlap," Moody's Risk Services, Presentation, Source Boston, Mar. 14, 2008, 19 pages.
Pending claims for U.S. Appl. No. 14/021,585, as of Apr. 29, 2016, 2 pages.
Pending claims for U.S. Appl. No. 14/021,585, as of Nov. 18, 2015, 6 pages.
U.S. Appl. No. 13/240,572 and pending claims as of Mar. 22, 2016, 10 pages.
U.S. Appl. No. 13/240,572 as of Oct. 7, 2015, application as filed and pending claims, 45 pages.
U.S. Appl. No. 14/021,585 and pending claims as of Mar. 22, 2016, 2 pages.
U.S. Appl. No. 14/021,585 as of Oct. 7, 2015 and application as filed, 70 pages.
U.S. Appl. No. 14/944,484 and pending claims as of Mar. 22, 2016, 4 pages.
U.S. Appl. No. 61/386,156 as of Oct. 7, 2015. 2 pages.
Application as filed and pending claims for U.S. Appl. No. 13/240,572 as of Apr. 29, 2016, 46 pages.
Application as filed and pending claims for U.S. Appl. No. 14/944,484 as of Apr. 29, 2016, 4 pages.
Paxson, Vern, "How The Pursuit of Truth Led Me To Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost In the Browser Analysis of Web-based Malware", 2007 (9 pages).
Rare Events, Oct. 2009, JASON, The Mitre Corporation, Oct. 2009, 104 pages.
Rees, L. P. et al., "Decision support for cybersecurity risk planning." Decision Support Systems 51.3 (2011): pp. 493-505.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
Santos, J. R. et al., "A framework for linking cybersecurity metrics to the modeling of macroeconomic interdependencies." Risk Analysis: An International Journal (2007) 27.5, pp. 1283-1297.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Search Query Report form IP.com (performed Apr. 27, 2020).
Security Warrior, Cyrus Peikari, Anton, Chapter 8: Reconnaissance, 6 pages.
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics vI.0.0, The Center for Internet Security, May 11, 2009, 90 pages.
The Dun & Bradstreet Corp. Stock Report, Standard & Poor's, Jun. 6, 2009, 8 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
Winship, C., "Models for sample selection bias", Annual review of sociology, 18(1) (Aug. 1992), pp. 327-350.
U.S. Appl. No. 15/271,655 Published as: US2018/0083999, Self-Published Security Risk Management, Sep. 21, 2016.
U.S. Appl. No. 15/377,574 U.S. Pat. No. 9,705,932, Methods and Systems for Creating, De-Duplicating, and Accessing Data Using an Object Storage System, Dec. 13, 2016.
U.S. Appl. No. 14/021,585 U.S. Pat. No. 9,438,615 Published as: US2015/0074579, Security Risk Management, Sep. 9, 2013.
U.S. Appl. No. 15/216,955 Published as: US 2016/0330231, Methods for Using Organizational Behavior for Risk Ratings, Jul. 22, 2016.
U.S. Appl. No. 15/239,063 Published as: US 2017/0093901, Security Risk Management, Aug. 17, 2016.
U.S. Appl. No. 16/405,121 Published as: US 2019/0260791, Methods for Using Organizational Behavior for Risk Ratings, May 7, 2019.
U.S. Appl. No. 17/025,930 Published as US2021/0006581, Methods for Using Organizational Behavior for Risk Ratings, Sep. 18, 2020.
U.S. Appl. No. 13/240,572 Published as: US 2016/0205126, Information Technology Security Assessment System, Sep. 22, 2011.
U.S. Appl. No. 14/944,484 U.S. Pat. No. 9,973,524 Published as: US 2016/0323308, Information Technology Security Assessment System, Nov. 18, 2015.
U.S. Appl. No. 15/142,677 U.S. Pat. No. 9,830,569 Published as: US 2016/0239772, Security Assessment Using Service Provider Digital Asset Information, Apr. 29, 2016.
U.S. Appl. No. 17/069,151 Published as: US 2021/0211454, Information Technology Security Assessment System, Oct. 13, 2020.
U.S. Appl. No. 15/134,845 U.S. Pat. No. 9,680,858, Annotation Platform for a Security Risk System, Apr. 21, 2016.

(56) References Cited

OTHER PUBLICATIONS

U.S. Appl. No. 15/044,952 Published as: US 2017/0236077, Relationships Among Technology Assets and Services and the Entities Responsible for Them, Feb. 16, 2016.
U.S. Appl. No. 15/089,375 U.S. Pat. No. 10,176,445 Published as: US 2017/0236079, Relationships Among Technology Assets and Services and the Entities Responsible for Them, Apr. 1, 2016.
U.S. Appl. No. 29/598,298 U.S. Pat. No. D. 835,631, Computer Display Screen With Graphical User Interface, Mar. 24, 2017.
U.S. Appl. No. 29/598,299 U.S. Pat. No. D. 818,475, Computer Display With Security Ratings Graphical User Interface, Mar. 24, 2017.
U.S. Appl. No. 29/599,622 U.S. Pat. No. D. 847,169, Computer Display With Security Ratings Graphical User Interface, Apr. 5, 2017.
U.S. Appl. No. 29/599,620 U.S. Pat. No. D. 846,562, Computer Display With Security Ratings Graphical User Interface, Apr. 5, 2017.
U.S. Appl. No. 16/015,686 U.S. Pat. No. 10,425,380, Methods for Mapping IP Addresses and Domains to Organizations Using User Activity Data, Jun. 22, 2018.
U.S. Appl. No. 16/543,075 U.S. Pat. No. 10,554,619, Methods for Mapping IP Addresses and Domains to Organizations Using User Activity Data, Aug. 16, 2019.
U.S. Appl. No. 16/738,825 U.S. Pat. No. 10,893,021, Methods for Mapping IP Addresses and Domains to Organizations Using User Activity Data, Jan. 9, 2020.
U.S. Appl. No. 17/146,064 Published as: US2021/0218702, Methods for Mapping IP Addresses and Domains to Organizations Using User Activity Data, Jan. 11, 2021.
U.S. Appl. No. 15/918,286 U.S. Pat. No. 10,257,219, Correlated Risk in Cybersecurity, Mar. 12, 2018.
U.S. Appl. No. 16/292,956 U.S. Pat. No. 10,594,723, Correlated Risk in Cybersecurity, Mar. 5, 2019.
U.S. Appl. No. 16/795,056 U.S. Pat. No. 10,931,705, Correlated Risk in Cybersecurity, Feb. 19, 2020.
U.S. Appl. No. 17/179,630 Published as US2021/0176269, Correlated Risk in Cybersecurity, Feb. 19, 2021.
U.S. Appl. No. 16/170,680 U.S. Pat. No. 10,521,583, Systems and Methods for Remote Detection of Software Through Browser Webinjects, Oct. 25, 2018.
U.S. Appl. No. 16/688,647 U.S. Pat. No. 10,776,483, Systems and Methods for Remote Detection of Software Through Browser Webinjects, Nov. 19, 2019.
U.S. Appl. No. 17/000,135 U.S. Pat. No. 11,126,723, Systems and Methods for Remote Detection of Software Through Browser Webinjects, Aug. 21, 2020.
U.S. Appl. No. 17/401,683 Published as US2021/0374243, Systems and Methods for Remote Detection of Software Through Browser Webinjects, Aug. 13, 2021.
U.S. Appl. No. 15/954,921 U.S. Pat. No. 10,812,520, Systems and Methods for External Detection of Misconfigured Systems, Apr. 17, 2018.
U.S. Appl. No. 17/014,495 Published as: US2020/0404017, Systems and Methods for External Detection of Misconfigured Systems, Sep. 8, 2020.
U.S. Appl. No. 16/549,764 Published as: US2021/0058421, Systems and Methods for Inferring Entity Relationships Via Network Communications of Users or User Devices, Aug. 23, 2019.
U.S. Appl. No. 16/787,650 U.S. Pat. No. 10,749,893, Systems and Methods for Inferring Entity Relationships Via Network Communications of Users or User Devices, Feb. 11, 2020.
U.S. Appl. No. 16/583,991 U.S. Pat. No. 10,848,382, Systems and Methods for Network Asset Discovery and Association Thereof With Entities, Sep. 26, 2019.
U.S. Appl. No. 17/085,550 U.S. Pat. No. 11,329,878 Published as: US2021/0099347, Systems and Methods for Network Asset Discovery and Association Thereof With Entities, Oct. 30, 2020.
U.S. Appl. No. 29/666,942 U.S. Pat. No. D. 892,135, Computer Display With Graphical User Interface, Oct. 17, 2018.
U.S. Appl. No. 16/360,641 U.S. Pat. No. 11,200,323, Systems and Methods for Forecasting Cybersecurity Ratings Based on Event-Rate Scenarios, Mar. 21, 2019.
U.S. Appl. No. 17/523,166 Published as US2022/0121753, Systems and Methods for Forecasting Cybersecurity Ratings Based on Event-Rate Scenarios, Nov. 10, 2021.
U.S. Appl. No. 16/514,771 U.S. Pat. No. 10,726,136, Systems and Methods for Generating Security Improvement Plans for Entities, Jul. 17, 2019.
U.S. Appl. No. 16/922,673 U.S. Pat. No. 11,030,325, Systems and Methods for Generating Security Improvement Plans for Entities, Jul. 7, 2020.
U.S. Appl. No. 29/677,306 U.S. Pat. No. D. 905,702, Computer Display Screen With Corporate Hierarchy, Jan. 18, 2019.
U.S. Appl. No. 16/775,840 U.S. Pat. No. 10,791,140, Systems and Methods for Assessing Cybersecurity State of Entities Based on Computer Network Characterization, Jan. 29, 2020.
U.S. Appl. No. 17/018,587 U.S. Pat. No. 11,050,779, Systems and Methods for Assessing Cybersecurity State of Entities Based on Computer Network Characterization, Sep. 11, 2020.
U.S. Appl. No. 16/779,437 U.S. Pat. No. 10,893,067 Published as: US2021/0243221, Systems and Methods for Rapidly Generating Security Ratings, Jan. 31, 2020.
U.S. Appl. No. 17/132,512 Published as US2021/0243221, Systems and Methods for Rapidly Generating Security Ratings, Dec. 23, 2020.
U.S. Appl. No. 17/119,822 U.S. Pat. No. 11,122,073, Systems and Methods for Cybersecurity Risk Mitigation and Management, Dec. 11, 2020.
U.S. Appl. No. 29/815,855, Computer Display With a Graphical User Interface for Cybersecurity Risk Management, Nov. 17, 2021.
U.S. Appl. No. 17/392,521 Published as US2022/0191232, Systems and Methods for Cybersecurity Risk Mitigation and Management, Aug. 3, 2021.
U.S. Appl. No. 16/802,232 U.S. Pat. No. 10,764,298, Systems and Methods for Improving a Security Profile of an Entity Based on Peer Security Profiles, Feb. 26, 2020.
U.S. Appl. No. 16/942,452 U.S. Pat. No. 11,265,330, Systems and Methods for Improving a Security Profile of an Entity Based on Peer Security Profile, Jul. 29, 2020.
U.S. Appl. No. 29/725,724, Computer Display With Risk Vectors Graphical User Interface, Feb. 26, 2020.
U.S. Appl. No. 29/736,641 U.S. Pat. No. D. 937,870, Computer Display With Peer Analytics Graphical User Interface, Jun. 2, 2020.
U.S. Appl. No. 17/039,675 U.S. Pat. No. 11,032,244 Published as US2021/0099428, Systems and Methods for Determining Asset Importance in Security Risk Management, Sep. 30, 2020.
U.S. Appl. No. 17/320,997 Published as US2021/0344647, Systems and Methods for Determining Asset Importance in Security Risk Management, May 14, 2021.
U.S. Appl. No. 16/884,607 U.S. Pat. No. 11,023,585, Systems and Methods for Managing Cybersecurity Alerts, May 27, 2020.
U.S. Appl. No. 17/236,594 Published as US2021/0374246, Systems and Methods for Managing Cybersecurity Alerts, Apr. 21, 2021.
U.S. Appl. No. 17/710,168, Systems and Methods for Assessing Cybersecurity Risk in a Work From Home Environment, Mar. 31, 2022.
U.S. Appl. No. 17/945,337, Systems and Methods for Precomputation of Digital Asset Inventories, Sep. 15, 2022.
U.S. Appl. No. 17/856,217, Systems and Methods for Accelerating Cybersecurity Assessments, Jul. 1, 2022.
Chernyshev, M. et al., "On 802.11 Access Point Locatability and Named Entity Recognition in Service Set Identifiers", IEEE Trans. on Info. and Sec., vol. 11 No. 3 (Mar. 2016).
Search Query Report from IP.com (performed Jul. 29, 2022).

SYSTEMS AND METHODS FOR GENERATING SECURITY IMPROVEMENT PLANS FOR ENTITIES

CROSS-REFERENCE TO RELATED APPLICATIONS

The present application is a continuation of U.S. patent application Ser. No. 16/922,673, filed Jul. 7, 2020 and titled "System and Methods for Generating Security Improvement Plans For Entities", which is a continuation of U.S. patent application Ser. No. 16/514,771, filed Jul. 17, 2019 and titled "System and Methods for Generating Security Improvement Plans For Entities", which are incorporated herein by reference in their entireties.

TECHNICAL FIELD

The following disclosure is directed to methods and systems for generating a security improvement plan for an entity and, more specifically, methods and systems for generating a security improvement plan for an entity based on security ratings of similar entities.

BACKGROUND

Ratings enable quantitative comparisons among entities (e.g., companies, students, automobiles, etc.). For example, ratings can be used by consumers to determine whether to buy from a particular company. In another example, ratings can be used by potential employees to determine whether to work at particular company. Thus, entities subject to a ratings scheme typically strive to improve their respective ratings to enhance their standing in their industry or community. One type of ratings scheme pertains to the security of an entity. Specifically, an entity (e.g., a company) can be rated based on past cybersecurity events and/or future cybersecurity risks. Aside from the company itself, there may be multiple stakeholders, e.g., insurance companies, business partners, and clients, that are invested in an improved security rating of the particular company.

Conventional methods utilize brittle rules or to use summary statistics from a vast data set to derive improvement plans. However, these methods can lead to crude or unrealistic plans for most entities.

SUMMARY

Disclosed herein are systems and methods for generating a security improvement plan for an entity with the goal of improving its security rating. An entity can include an organization, a company, a group, a school, a government, etc. An entity may be characterized by one or more static parameters, e.g., entity size, entity industry, entity location, etc., as these aspects of the entity do not typically change. It is understood that some of these aspects may indeed change over time (e.g., an entity may sell off a part of its business resulting in a decreased size, or it may venture into a new industry or location). In some embodiments, if a static parameter of an entity changes, the statistical classifier, as discussed below, may be retrained based on the changed value of the static parameter.

An improved security rating reflects improvements made to the security profile of the entity. Specifically, the security profile of an entity can be indicated by one or more input parameters, e.g., a number of botnet infections of the entity's computer network or a number of malware-infected servers associated with the entity. These input parameters are typically modifiable in that an entity can change or improve the value of the parameter, thereby improving its security rating. For example, an entity can strive to decrease the number of botnet infections or decrease the number of malware-infected servers. By doing so, an entity's security rating may increase, e.g., from 680 to 720, indicating an improved ability to withstand or prevent cybersecurity attacks. An improved security rating can also increase confidence of various stakeholders of the entity that the entity is more secure and/or protected from cybersecurity risks that it had previously been.

In many instances, for a given entity, the number of input parameters can be significant and, therefore, the space of possible improvement plans can be quite large. In some embodiments, the respective values of two or more input parameters may be correlated with one another. In some embodiments, the respective values of two or more input parameters may be interdependent. Though these relationships may exist, in many instances, the relationships may not be apparent or well-understood. This suggests that some or much of an entity's improvement plan space may not be sensible or achievable. In some cases, some of these improvement plans are unachievable by the particular entity because they are dependent on parameters that are difficult for the particular entity to modify. Therefore, determining an achievable improvement plan for an entity can be difficult due to the large space of possible plans and the implausibility of many areas of the space. Therefore, generating an achievable security improvement plan can depend on reducing the large space of possible improvement plans and eliminating unachievable portions of improvement plans.

Some embodiments of systems and methods described herein are configured to generate a feasible security improvement plan for the entity. A feasible security improvement plan is important to provide the entity with realistic, achievable goals with a reasonable expectation and/or a reasonable likelihood of achieving those goals. A security improvement plan can include value(s) for one or more modifiable input parameters of the entity such that the value(s) contribute to an increase in the security rating of the entity. The exemplary systems and method described herein can focus the space of possible improvement plans by using data related to similar entities that share the parameters of a particular entity for which the plan is generated.

In accordance with an embodiment of the disclosure, a computer-implemented method is provided for statistical modeling of entities of a particular type. The method can include obtaining entity data including a plurality of entity data sets, each entity data set associated with a respective entity and including values for one or more static parameters indicative of a type of the entity. The values of the static parameters for each of the entity data sets can indicate that the type of the entity matches the particular type, and each entity data set can include (i) values for one or more input parameters indicative of a security profile of the entity and (ii) a value of a security class parameter indicative of a security class of the entity based on the values of the input parameters. The method can include training a statistical classifier to infer a value of the security class parameter indicative of the security class of a particular entity of the particular type based on values of one or more of the input parameters indicative of a security profile of the particular entity. The training the statistical classifier can include fitting the statistical classifier to the plurality of entity data sets.

Various embodiments of the method can include one or more of the following features. The static parameters can include (i) entity size, (ii) entity industry, and/or (iii) entity location. The values of two or more static parameters for each of the entity data sets can indicate that the type of the entity matches the particular type. The method can include selecting a target value for the security class parameter indicative of the security class for the particular entity. The plurality of entity data sets can include one or more entity data sets for which the value of the security class parameter is lower than the target value and one or more entity data sets for which the value of the security class parameter is at or above than the target value. The plurality of entity data sets includes at least three entity data sets for which the value of the security class parameter is lower than the target value and at least three entity data set for which the value of the security class parameter is at or above than the target value.

The security profile can include security practices and/or a security record of an entity. One or more input parameters indicative of the security profile of the entity can include: (a) an amount of capital investment in security of the entity; (b) a measure of employee training in security of the entity; (c) a measure of organization of a team dedicated to information security; and/or (d) an amount of budget dedicated to information security. One or more input parameters indicative of the security profile of the entity can include: (i) a number and/or severity of botnet infection instances of a computer system associated with the entity; (ii) a number of spam propagation instances originating from a computer network associated with the entity; (iii) a number of malware servers associated with the entity; (iv) a number of potentially exploited devices associated with the entity; (v) a number of hosts authorized to send emails on behalf of each domain associated with the entity; (vi) a determination of whether a DomainKeys Identified Mail (DKIM) record exists for each domain associated with the entity and/or a key length of a public key associated with a Domain Name System (DNS) record of each domain associated with the entity; (vii) an evaluation of a Secure Sockets Layer (SSL) certificate and/or a Transport Layer Security (TLS) certificate associated with a computer system of the entity; (viii) a number and/or type of service of open ports of a computer network associated with the entity; (ix) an evaluation of security-related fields of an header section of HTTP response messages of hosts associated with the entity; (x) a rate at which vulnerabilities are patched in a computer network associated with the entity; (xi) an evaluation of file sharing traffic originating from a computer network associated with the entity; and/or (xii) a number of lost records and/or sensitivity of information in the lost records in a data breach of a computer system associated with the entity.

The security class can be a security rating of the entity. The value of the security class parameter can be indicative of a security class above or below a target security rating. The statistical classifier can be: (i) a K-nearest neighbor algorithm, (ii) a support vector machine (SVM) model, or (iii) random forest classifier. Each entity data set can include two or more input parameters indicative of the security profile of the entity. The method can include, for a first input parameter of the two or more input parameters: determining a relationship between at least one value of the first input parameter and at least one value of a second input parameter; and storing the relationship in a database. The method can include determining relationships between a plurality of values of the first input parameter and a plurality of values of the second input parameter. The plurality of values of the first input parameter can include one or more values of the first input parameter and the plurality of values of the second input parameter can include one or more values of the second input parameter.

The method can include receiving values of the two or more input parameters for the particular entity; adjusting the value of the first input parameter of the two or more input parameters; determining the value of the second input parameter of the two or more input parameters based on the stored relationship in the database; using the trained statistical classifier on the adjusted value of the first input parameter and the determined value of the second input parameter to infer a value of the security class parameter indicative of the security class of the particular entity; comparing the value of the security class parameter to a target value to determine whether the adjustment of the value of the first input parameter results in a value of the security class parameter at, above, or below the target value. If the adjustment of the value of the first input parameter results in a value above the target value, the method can include generating a security improvement plan based on the adjusted value of the first input parameter and the determined value of the second input parameter, such that, if executed by the particular entity, increases the value of the security class parameter of the particular entity to or above the target value.

The security improvement plan can include a target value for at least one input parameter for the particular entity, in which the target value is different than the value of the at least one input parameter. The method can include presenting the security improvement plan via a user interface. The security improvement plan can include a prescription to adjust at least one of the input parameters. The method can include determining an explanation for the prescription using one or more explanation techniques selected from the group consisting of: (i) local interpretable model-agnostic explanation (LIME), (ii) high-precision model-agnostic explanation, (iii) Skater model interpretation, or (iv) random forest feature tweaking. The method can include presenting the explanation via the user interface. The method can include, if the adjustment of the value of the first input parameter results in the value of the security class parameter being at or above the target value, determining a target value for the first input parameter by: receiving two or more values of the first input parameter from two or more entity data sets of entities having a value of the security class parameter greater than the target value; determining a mean of the two or more values; generating a security improvement plan prescribing the mean value for the first input parameter of the particular entity.

DETAILED DESCRIPTION

Figure 1A:
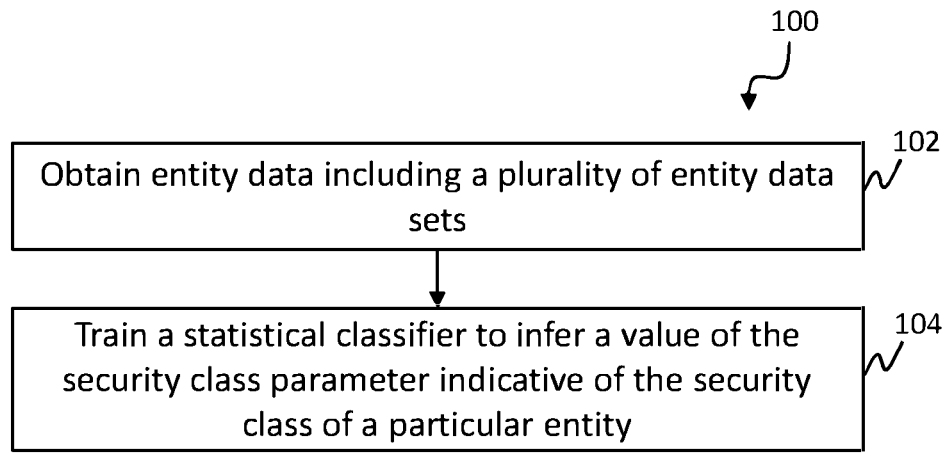
FIG. 1A is a flowchart of an exemplary method for statistical modeling of entities of a particular type.

Disclosed herein are exemplary embodiments of systems and methods for generating security improvement plans for entities. The security improvement plans can include values for one or more modifiable parameters (also referred to as "input parameters" herein) that a given entity can act upon to improve its security rating. Examples of security ratings and the determination of security ratings for entities can be found in commonly owned U.S. Pat. No. 9,973,524 issued May 15, 2018 and titled "Information Technology Security Assessment System," the entirety of which is incorporated by reference herein. One example of a security rating (provided by BitSight Technologies, Inc., Boston, Mass.) has a scale from 300 (lowest) to 900 (highest). In some embodiments, lower security ratings signify high incidence of past security events and/or high risk of future security risk. Conversely, higher security ratings can signify low incidence of past security events and/or low risk of future security risk.

In the below disclosure, the following non-limiting example entity is utilized for illustrating the exemplary systems and methods described herein:

Corporation A is a financial services company (static parameter "industry") having approximately 190 employees (static parameter "size") in the northwest region of the United States (static parameter "location").

Corporation A is seeking to increase its security rating from its current security rating of 560 to the target security rating of at least 720.

Similar Entities & Related Datasets

In some embodiments, the systems and methods described herein generate achievable security improvement plans by utilizing data associated with similar entities to the particular entity for which the plan is generated. In some embodiments, these similar entities can include those entities that have one or more static parameters that are shared with the particular entity. In some embodiments, the similarity between a first entity and a second entity is determined by a percentage of static parameters. For example, the first entity may share at least 50% of the static parameters with the second entity and therefore be considered to be "similar" to the second entity. In other examples, the first entity shares at least 70%, at least 80%, or at least 90% of the static parameters with the second entity to be considered "similar" to the second entity.

The below table provides an example set of entities sharing one or more static parameters with the exemplary "Corporation A," as described above.

TABLE 1

List of entities, their associated static parameters, and similarity to Corporation A. Note, in this example, that the similarity of the size of entities may be determined by a predetermined category of sizes for financial service companies (e.g., 1-50 employees, 51-200 employees, 201-500 employees, 501+ employees).

| Entity | Static Parameters {industry, size, location} | Similarity |
| --- | --- | --- |
| Corporation B | {financial services, 200 employees, southwest US} | 2/3 |
| Corporation F | {financial services, 150 employees, northwest US} | 3/3 |

TABLE 1-continued

List of entities, their associated static parameters, and similarity to Corporation A. Note, in this example, that the similarity of the size of entities may be determined by a predetermined category of sizes for financial service companies (e.g., 1-50 employees, 51-200 employees, 201-500 employees, 501+ employees).

| Entity | Static Parameters {industry, size, location} | Similarity |
| --- | --- | --- |
| Corporation K | {financial services, 540 employees, northwest US} | 2/3 |
| Corporation Q | {financial services, 175 employees, southeast US} | 2/3 |
| Corporation S | {financial services, 50 employees, northeast US} | 1/3 |

In the above example utilizing a 50% threshold in determining similarity between entities, only Corporation S lacks in similarity to Corporation A in most of the static parameters. Thus, only Corporation B, F, K, and Q would be used to train the statistical model to generate a security improvement panel for Corporation A, as described below.

In some embodiments, similar entities having security ratings above and below the target security rating are selected for generating the security improvement plan. Selecting entities having security ratings above the target security rating can contribute to determining which values for modifiable parameters that is likely to increase the particular entity's security rating. Selecting entities having security ratings below the target security rating can contribute to determining which values will not lead the particular entity to its target security rating (or above the target security rating). In some embodiments, similar entities having security ratings at, above, and below the target security rating are selected so that both of the above-described benefits are included in the generated security improvement plan. In some embodiments, a minimum number (e.g., at least three, at least 5, at least 10, etc.) of similar entities are selected for training the statistical model. In some embodiments, the number of similar entities having security ratings above the target security rating is approximately equal to the number of similar entities having security ratings below the target security rating. For example, approximately twenty similar entities may be selected having security ratings above the target security rating and approximately twenty similar entities may be selected below the security rating.

In some embodiments, for each of the similar entities, an entity data set is obtained. Continuing the above example, Table 2 lists the security ratings for the above 'similar' entities to Corporation A at a particular time.

TABLE 2

List of similar entities and their corresponding security ratings at a particular time (e.g., 3 months ago, present date, etc.).

| Entity | Security Rating |
| --- | --- |
| Corporation B | 710 |
| Corporation F | 535 |
| Corporation K | 745 |
| Corporation Q | 680 |

In some embodiments, the security ratings of the similar entities include security ratings over a period, e.g., from a first time (e.g., 3 years ago, 1 year ago, 6 months ago, etc.) to a second time (e.g., 1 year ago, 6 months ago, present date, etc.). In some embodiments, the security ratings of entities may be averaged over some time period (e.g., within the last three months, last six months, last one year, etc.) to determine whether the entity should be selected. In some embodiments, other data related to security ratings can be obtained. For example, the other data can include data related to security events, components of the security ratings, analytics associated with the security ratings, etc. Examples of data related to security ratings can be found in U.S. patent application Ser. No. 16/360,641 titled "Systems and methods for forecasting cybersecurity ratings based on event-rate scenarios,".

Training the Statistical Model

In some exemplary methods discussed herein, to determine values for the modifiable input parameters for the security improvement plan of a particular entity, a statistical model can be trained. In some embodiments, the statistical model can be trained on a plurality of entity data sets of entities similar to the particular entity. Further, the plurality of entity data sets can be selected such that the similar entities have security ratings both above and below the target security rating.

Figure 1B:
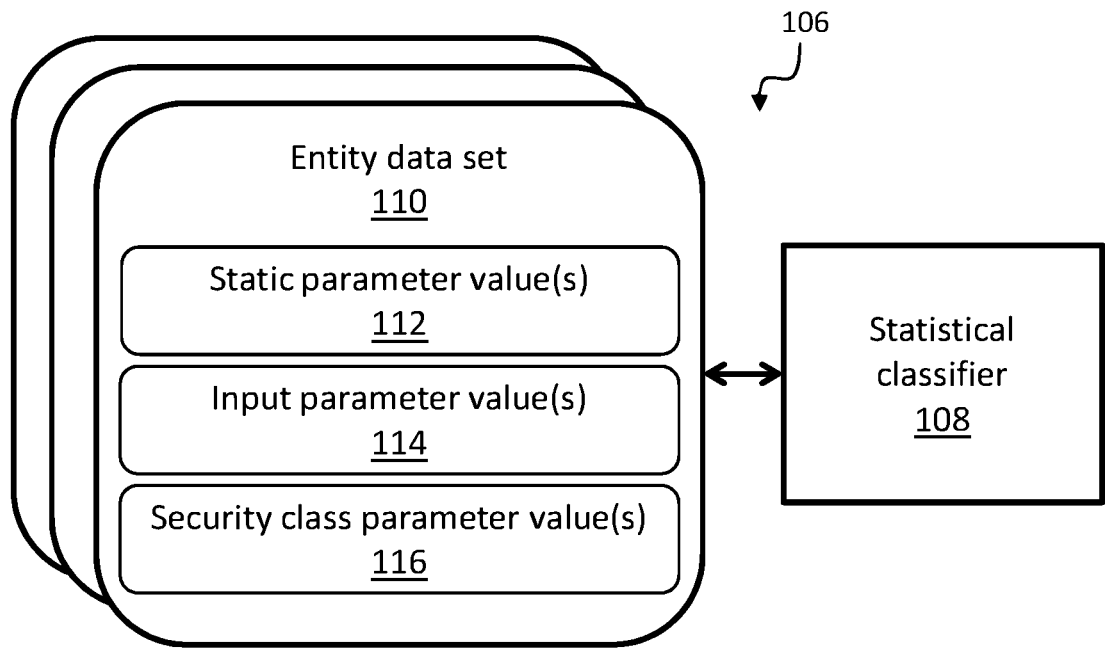
FIG. 1B is a diagram of the workflow for training the statistical model in FIG. 1A.

FIG. 1A is a flowchart illustrating a method 100 for statistical modeling of entities of a particular type. FIG. 1B is a diagram illustrating workflow 106 of training the statistical classifier 108. Step 102 of method 100 includes obtaining entity data including a plurality of entity datasets. Each entity data set 110 can be associated with a respective entity and include value(s) for one or more static parameters 112 indicative of a type of the entity. For example, the static parameters 112 can include entity size, entity industry, and/or entity location. The values of the static parameters 112 for each entity data set can indicate whether the type of the entity matches the particular type associated with the particular entity (see discussion above under heading "Similar Entities & Related Datasets").

In some embodiments, each entity data set can include (i) values for one or more input parameters 114 indicating the security profile of the entity and/or (ii) a value of a security class parameter 116 indicating the security class of the entity based on the value(s) of the input parameter(s) 114. The security profile may include the security practices and/or security record of an entity. In some embodiments, the input parameters 114 can include one or more of:

- an amount of capital investment in security of the entity;
- a measure of employee training in security of the entity;
- a measure of organization of a team dedicated to information security;
- an amount of budget dedicated to information security;
- a number and/or severity of botnet infection instances of a computer system associated with the entity;
- a number of spam propagation instances originating from a computer network associated with the entity;
- a number of malware servers associated with the entity;
- a number of potentially exploited devices associated with the entity;
- a number of hosts authorized to send emails on behalf of each domain associated with the entity;
- a determination of whether a DomainKeys Identified Mail (DKIM) record exists for each domain associated with the entity and/or a key length of a public key associated with a Domain Name System (DNS) record of each domain associated with the entity;
- an evaluation of a Secure Sockets Layer (SSL) certificate and/or a Transport Layer Security (TLS) certificate associated with a computer system of the entity;
- a number and/or type of service of open ports of a computer network associated with the entity;
- an evaluation of security-related fields of an header section of HTTP response messages of hosts associated with the entity;
- a rate at which vulnerabilities are patched in a computer network associated with the entity;
- an evaluation of file sharing traffic originating from a computer network associated with the entity; or
- a number of lost records and/or sensitivity of information in the lost records in a data breach of a computer system associated with the entity.

In some embodiments, an entity data set can include two or more input parameters 114 (e.g., of those listed above). Thus, in some cases, the exemplary methods described herein can further include determining a relationship between a value of the first input parameter and a value of the second input parameter. This relationship can be stored in a database. For example, the number of botnet infections of an entity may be correlated with the number of potentially exploited devices associated with the entity. This correlation can be stored and referenced in the future. In some embodiments, the database includes the relationship between a plurality of values for the first input parameter and a plurality of values for the second input parameter. Relationships between values of the first and second parameters can be of a linear, non-linear, inverse, or other type. In some cases, the relationships can be stochastic.

In some embodiments, the security class parameter 116 of an entity is associated with, related to, or equal to the security rating of that entity (e.g., on a scale from 300 to 900, as provided by BitSight Technologies, Inc., Boston, Mass. and discussed above). For example, a first value of the security class parameter 116 is associated with, related to, or equal to a first security rating (e.g., 600); a second value of the security class parameter 116 is associated with, related to, or equal to a second security rating (e.g., 601); and so on. In some embodiments, the security class parameter 116 is associated with ranges of the security rating of the entity. For example, a first value of the security class parameter 116 is associated with, related to, or equal to a first security rating range (e.g., 600-649); a second value of the security class parameter 116 is associated with, related to, or equal to a second security rating (e.g., 650-659); and so on. In some embodiments, the value of the security class parameter 116 can indicate whether the security rating of the entity is at, above, or below a target security rating. For example, a first value of security class parameter is associated with, related to, or equal to a first set of security ratings at or above the target security rating (e.g., for a target security rating of 720, the first set of security ratings is 720-900); a second value of security class parameter is associated with, related to, or equal to a second set of security ratings below the target security rating (e.g., for a target security rating of 720, the second set of security ratings is 300-719).

In some embodiments, the method 100 can include selecting a target value for security class parameter 116 indicative of the security class for the particular entity. Having selected a target value, the plurality of entity data sets are chosen such that they include entity data set(s) for which the value of the security class parameter 116 is lower than the target value and entity data set(s) for which the value of the security class parameter 116 is greater than the target value. For example, if the target value of the security class parameter 116 (e.g., the security rating) for the particular entity is 720, then the data sets of one or more entities having a security rating less than 720 and the data sets of one or more entities having a security rating greater than 720 are selected for training the statistical classifier 108. In some cases, it can be beneficial to include entity data sets of having security class parameter values both above and below the target value in the training of the statistical model so that the generated security improvement plan, as discussed further below, includes values for one or more input parameters that can help the particular entity achieve the target security rating (or above the target security rating). Additionally or alternatively, the generated security improvement plan can provide values that can harm the particular entity's security rating (in other words, to illustrate for the particular entity 'what not to do' in their security practices).

Step 104 of method 100 includes training a statistical classifier to infer a value of the security class parameter indicative of the security class for the particular entity based on values of one or more of the input parameters indicative of a security profile of the particular entity. The training can include fitting the statistical classifier 108 to the plurality of entity data sets 110. Examples of the statistical classifier 108 can include any suitable statistical model for this use and can include any one of the following algorithms or models: a K-nearest neighbor algorithm; a support vector machine (SVM) model; or a decision tree-based model. For example, the decision tree-based model can be a random decision forest classifier (also known as a 'random forest'). In some embodiments, the SVM model can include a radial basis function (RBF) kernel.

Generating Improvement Plans

Figure 2A:
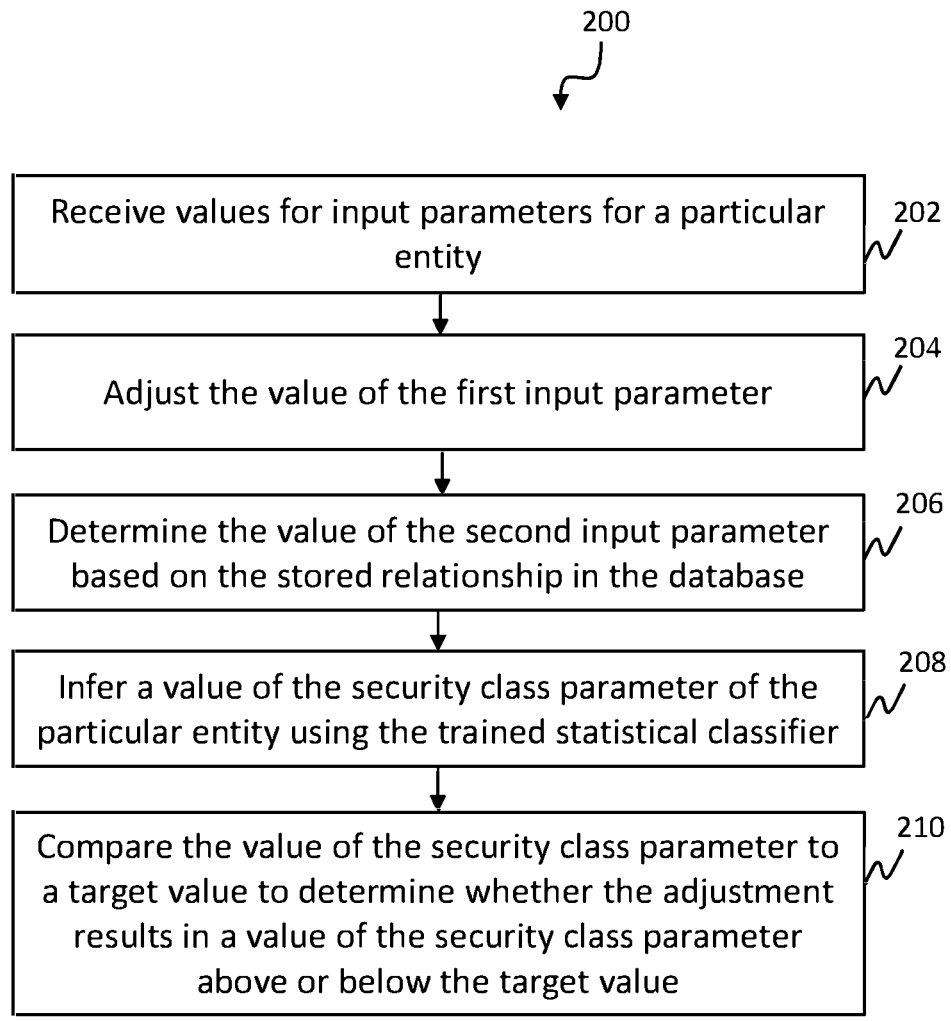
FIG. 2A is a flowchart of an exemplary method for using the trained statistical model.

FIG. 2A illustrates a method 200 for using the trained statistical classifier of method 100. In step 202 of method 200, values of input parameter(s) for the particular entity are received. In step 204 of method 200, the value of the first input parameter is adjusted (e.g., increased or decreased). In step 206, the value of the second input parameter is determined based on the stored relationship in the database. Referring to the example provided above, if there is an increased number of botnet infections (the value of the first parameter), then there is an expected increase in the number of potentially exploited devices (the value of the second parameter) based on the stored relationship. Therefore, the number of potentially exploited devices is determined to increase as well.

In step 206, the trained statistical classifier (see discussion above under heading "Training the Statistical Model") can be used on the adjusted value of the first input parameter and the determined value of the second input parameter to infer a value of the security class parameter of the entity. In step 208, the value of the security class parameter can be compared to a target value to determine whether the adjustment of the value of the first input parameter results in a value of the security class parameter above or below the target value. For example, the classifier may infer a value of the security class parameter (e.g., the security rating) to be 685 based on an increased number of botnet infections. If the target value of the security class parameter (e.g., the security rating) is 720, then the adjustment results in a value of the security class parameter below the target value (e.g., 685 compared to 720).

Figure 2B:
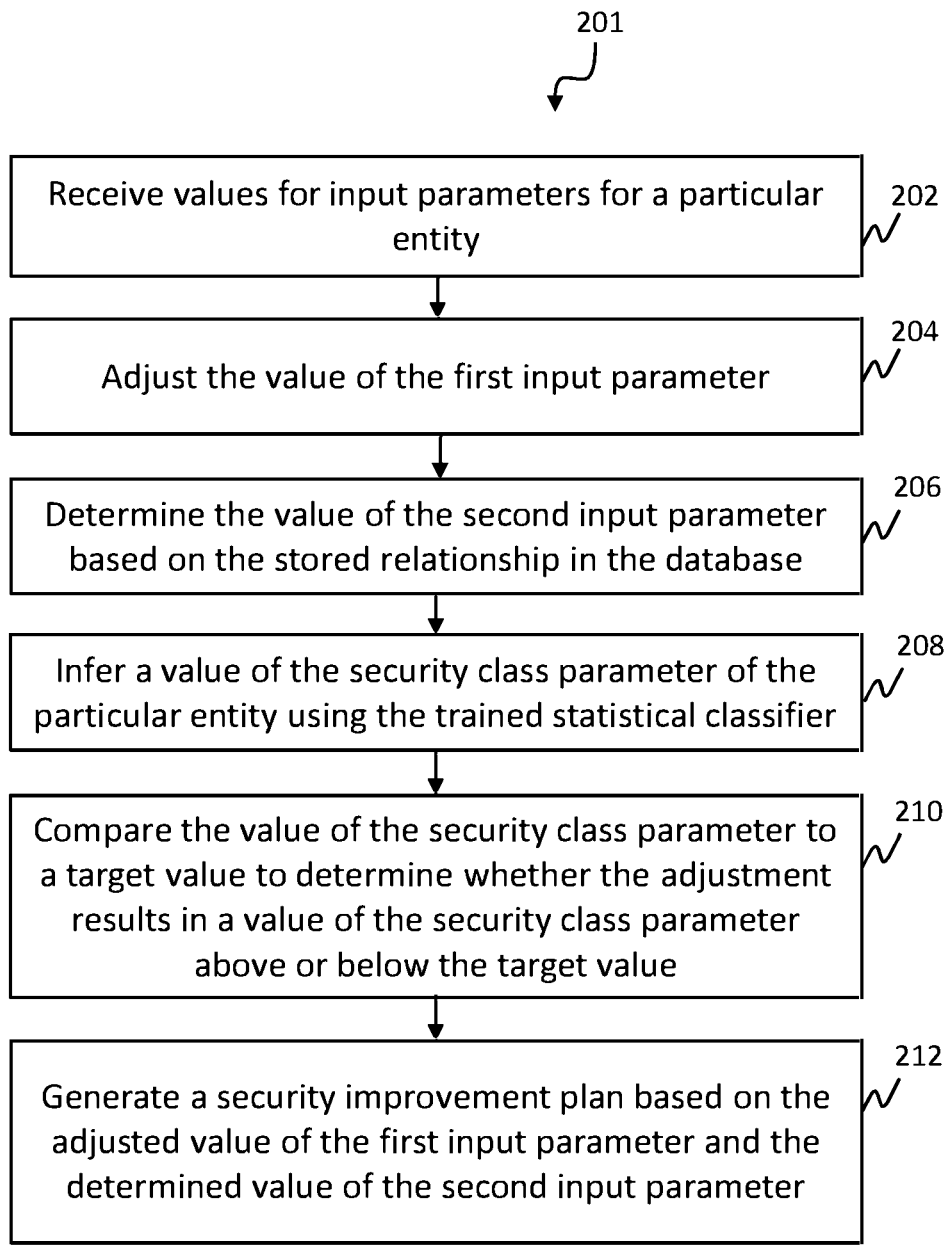
FIG. 2B is a flowchart of exemplary method for generating a security improvement plan.
Figure 2C:
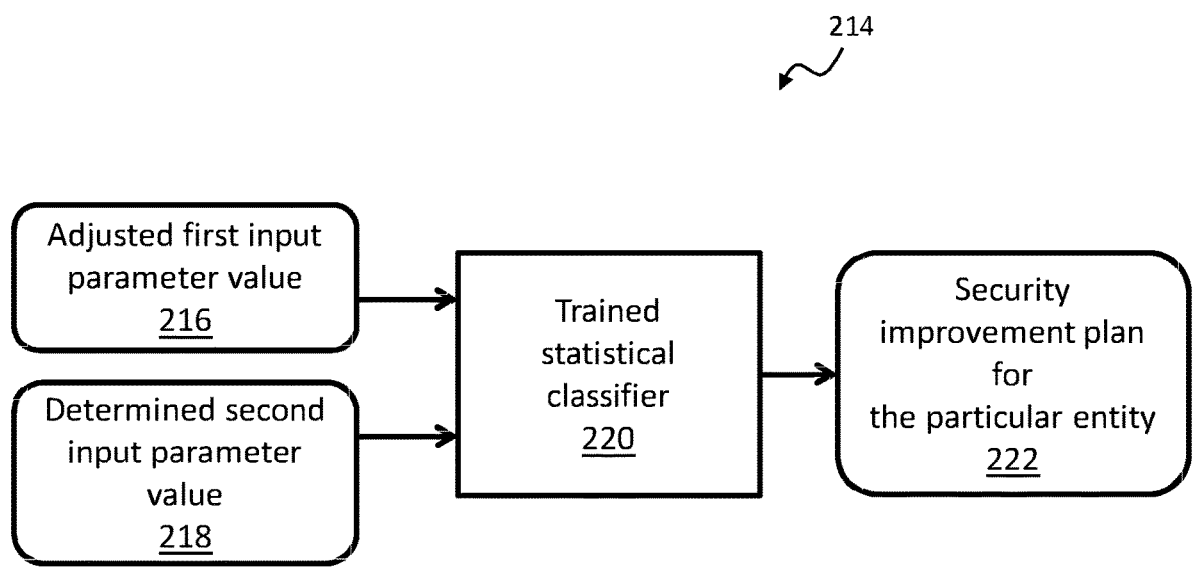
FIG. 2C is a diagram of the workflow for generating the security improvement plan of FIG. 2B.
Figure 3:
FIG. 3 is a diagram of an exemplary security improvement plan for a particular entity.

FIG. 2B illustrates a method 201 for generating a security improvement plan for the particular entity. FIG. 2C illustrates a workflow 211 for generating the security improvement plan using the trained classifier (refer to exemplary method 200 for description related to steps 202 through 210). In step 212 of method 201, a security improvement plan 222 can be generated for the particular entity. The security improvement plan can be based on the adjusted value of the first input parameter and the determined value of the second input parameter. If executed by the particular entity, the security improvement plan 222 can increase the value of the security class parameter of the particular entity to or above the target value. In an ideal scenario, the particular entity is expected to execute the generated security improvement plan 222 by attempting to attain each of the values of the modifiable input parameters. In some embodiments, the security improvement plan 222 is presented to a user (e.g., company representative, insurance representative, etc.) via a user interface. FIG. 3 is a diagram of an exemplary security improvement plan 214 for the particular entity.

In some embodiments, exemplary method 200 and/or exemplary method 201 can include determining the mean of two or more values of the first input parameter from two or more entity data sets of entities having a value of the security class parameter greater than the target value. Methods 200 and/or 201 can include the generation of a security improvement plan 222 prescribing the mean value for the first input parameter of the particular entity. In some embodiments, this technique can be repeated for each input parameter that is found to contribute to an improved security rating for the entity. For example, the contribution of an input parameter to the security rating can be determine by steps 202-210 of methods 200 or 201.

In some embodiments, the security improvement plan for the particular entity can include a prescription to adjust at least one input parameter. It can be beneficial to provide explanations to the particular entity as to why modifying the values of which parameters helps the entity achieve the desired security rating. The method 201 can include one or more explanation techniques, e.g., local interpretable model-agnostic explanation (LIME), high-precision model-agnostic explanation (referred to as 'anchors'), Skater model interpretation, random forest feature tweaking, etc. In some embodiments, the explanations can be presented to the user via the user interface.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 4:
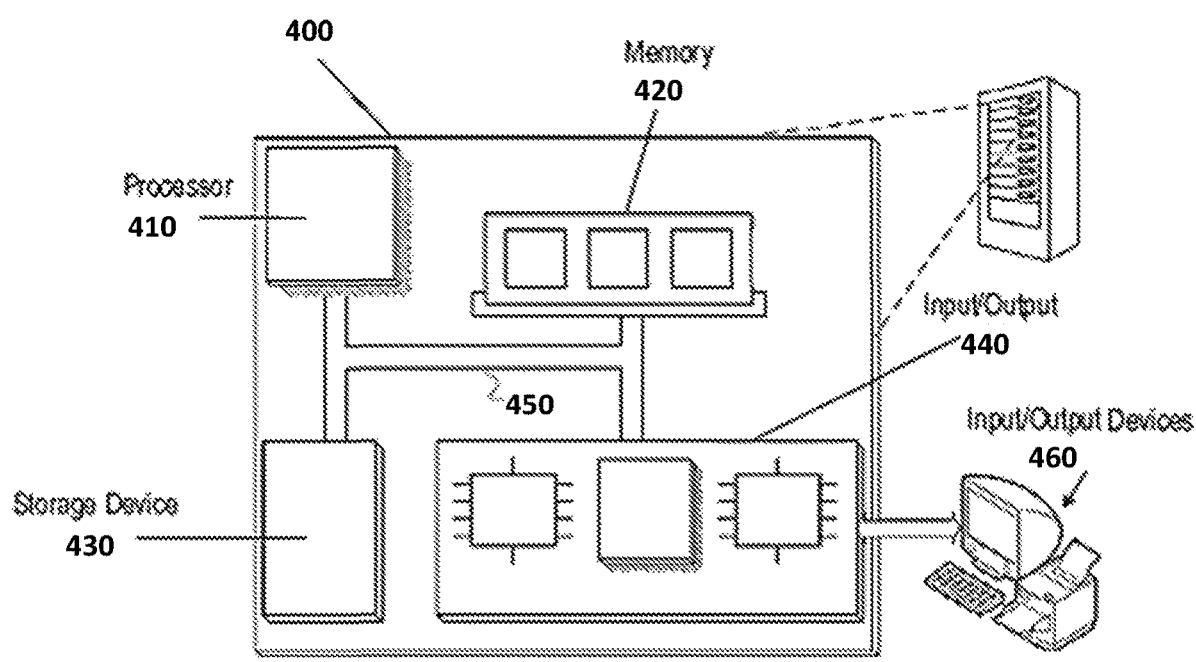
FIG. 4 is a diagram of an exemplary computer system that may be used in implementing the systems and methods described herein.

FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a nonvolatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for executing a security improvement plan for a particular organization, the method comprising:
   receiving an organization data set for the particular organization, the organization data set comprising:
   (i) a value for at least one static parameter indicative of a type of the organization;
   (ii) a value for at least two input parameters indicative of a security profile of the particular organization; and
   (iii) a value of a security class parameter indicative of a security class of the particular organization;
   adjusting a value of a first input parameter of the input parameters;
   determining a value of a second input parameter of the input parameters based on a relationship between the value of the first input parameter and the value of the second input parameter;
   using a trained statistical classifier on the adjusted value of the first input parameter and the determined value of the second input parameter to infer an adjusted value of the security class parameter; and
   if the adjustment of the value of the first input parameter results in an increased value of the security class parameter, selecting the first input parameter for modification in a security improvement plan based on the adjusted value of the first input parameter, wherein modification of the first input parameter by the particular organization implies an increase in the value of the security class parameter of the particular organization.

2. The method of claim 1, further comprising:
   comparing the adjusted value of the security class parameter to a target value to determine whether the adjustment of the value of the first input parameter results in a value of the security class parameter at, above, or below the target value.

3. The method of claim 2, wherein selecting the first input parameter for modification comprises:
   executing the security improvement plan for the particular organization, wherein execution of the security improvement plan results in an increase in the value of the security class parameter of the particular organization at or above the target value, wherein generation of the security improvement plan is based on the adjusted value of the first input parameter.

4. The method of claim 1, wherein the security improvement plan comprises a target value for at least one input parameter for the particular organization, the target value being different than the value of the at least one input parameter.

5. The method of claim 1, further comprising:
   presenting the security improvement plan via a user interface.

6. The method of claim 1, wherein the security improvement plan includes a prescription to adjust at least one of the input parameters, the method further comprising:
   determining an explanation for the prescription using one or more explanation techniques selected from the group consisting of: (i) local interpretable model-agnostic explanation (LIME), (ii) high-precision model-agnostic explanation, (iii) Skater model interpretation, or (iv) random forest feature tweaking.

7. The method of claim 6, further comprising:
   presenting the explanation via the user interface.

8. The method of claim 1, further comprising:
   determining a target value for the first input parameter by:
      receiving two or more values of the first input parameter from two or more organization data sets of entities having a value of the security class parameter greater than the target value; and
      determining a mean of the two or more values,
      wherein selecting the first input parameter for modification comprises using the mean value for the first input parameter of the particular organization.

9. The method of claim 1, wherein the relationship between at least one value of the first input parameter and at least one value of a second input parameter is stored in a database, and wherein the method comprises:
   retrieving the stored relationship from the database.

10. The method of claim 1, wherein the static parameters comprise at least one of (i) organization size, (ii) organization industry, and/or (iii) organization location.

11. The method of claim 1, wherein the security profile comprises security practices and/or a security record of an organization.

12. The method of claim 1, wherein the one or more input parameters indicative of the security profile of the organization comprise at least one of:
   an amount of capital investment in security of the organization;
   a measure of employee training in security of the organization;
   a measure of organization of a team dedicated to information security; or
   an amount of budget dedicated to information security.

13. The method of claim 1, wherein the one or more input parameters indicative of the security profile of the organization comprise at least one of:
- a number and/or severity of botnet infection instances of a computer system associated with the organization;
- a number of spam propagation instances originating from a computer network associated with the organization;
- a number of malware servers associated with the organization;
- a number of potentially exploited devices associated with the organization;
- a number of hosts authorized to send emails on behalf of each domain associated with the organization;
- a determination of whether a DomainKeys Identified Mail (DKIM) record exists for each domain associated with the organization and/or a key length of a public key associated with a Domain Name System (DNS) record of each domain associated with the organization;
- an evaluation of a Secure Sockets Layer (SSL) certificate and/or a Transport Layer Security (TLS) certificate associated with a computer system of the organization;
- a number and/or type of service of open ports of a computer network associated with the organization;
- an evaluation of security-related fields of an header section of HTTP response messages of hosts associated with the organization;
- a rate at which vulnerabilities are patched in a computer network associated with the organization;
- an evaluation of file sharing traffic originating from a computer network associated with the organization; or
- a number of lost records and/or sensitivity of information in the lost records in a data breach of a computer system associated with the organization.

14. The method of claim 1, wherein the statistical classifier was trained by:
- obtaining organization data including a plurality of organization data sets, each organization data set associated with a respective organization and including:
  - (i) a value for at least one static parameter indicative of a type of the organization, wherein the values of the static parameter indicates that the type of the organization matches the particular type;
  - (ii) a value for at least one input parameter indicative of a security profile of the organization;
  - (iii) a value of a security class parameter indicative of a security class of the organization based on the value of the at least one input parameter;
- training the statistical classifier to infer a value of the security class parameter indicative of the security class of a particular organization of the particular type based on values of the at least one input parameter indicative of a security profile of the particular organization, wherein training the statistical classifier comprises fitting the statistical classifier to the plurality of organization data sets.

15. The method of claim 14, wherein each organization data set includes two or more input parameters indicative of the security profile of the organization, the method further comprising:
- for a first input parameter of the two or more input parameters, determining the relationship between at least one value of the first input parameter and at least one value of a second input parameter.

16. The method of claim 15, further comprising:
- determining relationships between a plurality of values of the first input parameter and a plurality of values of the second input parameter, wherein the plurality of values of the first input parameter comprises the at least one value of the first input parameter and the plurality of values of the second input parameter comprises the at least one value of the second input parameter.

17. The method of claim 14, wherein the values of two or more static parameters for each of the organization data sets indicate that the type of the organization matches the particular type.

18. The method of claim 14, further comprising:
- selecting a target value for the security class parameter indicative of the security class for the particular organization,
- wherein the plurality of organization data sets includes at least one organization data set for which the value of the security class parameter is lower than the target value and at least one organization data set for which the value of the security class parameter is at or above than the target value.

19. The method of claim 18, wherein the plurality of organization data sets includes at least three organization data sets for which the value of the security class parameter is lower than the target value and at least three organization data sets for which the value of the security class parameter is at or above than the target value.

20. The method of claim 1, wherein the security class is a security rating of the particular organization.

* * * * *